United States Patent [19]

Fries et al.

[11] Patent Number: 4,493,210
[45] Date of Patent: Jan. 15, 1985

[54] ANTI-BLOCK CONTROL SYSTEM TEST

[75] Inventors: Herbert Fries, Oberthal; Jürgen Gerstenmaier, Neckargmünd; Stefan Kircher, Ludwigsburg; Jürgen Koch-Dücker, Edingen, all of Fed. Rep. of Germany

[73] Assignee: Robert Bosch GmbH, Stuttgart, Fed. Rep. of Germany

[21] Appl. No.: 474,574

[22] PCT Filed: Jun. 22, 1982

[86] PCT No.: PCT/DE82/00131
§ 371 Date: Feb. 22, 1983
§ 102(e) Date: Feb. 22, 1983

[87] PCT Pub. No.: WO83/00124
PCT Pub. Date: Jan. 20, 1983

[30] Foreign Application Priority Data

Jul. 2, 1981 [DE] Fed. Rep. of Germany ....... 3126102

[51] Int. Cl.$^3$ .............................................. G01L 5/28
[52] U.S. Cl. ........................................ 73/121; 303/92; 340/52 B
[58] Field of Search ................. 73/121, 129; 188/1.11; 303/DIG. 1, 92; 340/52 B

[56] References Cited

U.S. PATENT DOCUMENTS 4,092,853 6/1978 Schneider et al. ................... 73/121
4,192,180 3/1980 Gerstenmeier et al. .............. 73/121

FOREIGN PATENT DOCUMENTS 2701159 2/1980 Fed. Rep. of Germany .
2057798 4/1981 United Kingdom .

Primary Examiner—Jerry W. Myracle
Attorney, Agent, or Firm—Frishauf, Holtz, Goodman & Woodward

[57] ABSTRACT

An anti-block control system has four identically designed control channels. Safety circuits (8, 8') are also provided for monitoring the system, as are devices for testing the operability of the system. In this test, performed while the vehicle is stopped or when it is started, a test signal is fed into the channels and the effects of this signal are compared, in pairs, at locations of the controller corresponding to one another. A signal train is formed when the comparison is made. In accordance with the invention, two safety circuits (8, 8') are provided, each associated with a pair of channels, and the signals from all the channels are supplied, in pairs, to the safety circuits. The safety circuits include timing elements. During a test cycle, the signal trains in the two channel pairs generated by using the test signal are compared with one another by use of two comparator circuits (23, 23'), and in the case of non-agreement, a warning or switching signal (18, 18', 31) is generated.

10 Claims, 2 Drawing Figures

ANTI-BLOCK CONTROL SYSTEM TEST

The invention relates to a vehicle wheel anti-block control system in which the wheels of a vehicle are separately monitored.

BACKGROUND

Four identically designed control channels, comprising sensors, an evaluation circuit and a brake control unit, for the various wheel brakes are provided as well as safety circuits and devices for testing the operability of the anti-block control system at timed intervals in a test cycle. An identical test signal is fed from the test device into all the channels, and the effects of these test signals are compared by the safety circuit and the test device at predetermined, corresponding locations in the channels, specifically in pairs, with respect to an at least approximate agreement in terms of the time of occurrence and/or the value of the occurring signal; a switching and/or warning signal is generated whenever the compared signals deviate from one another by a predetermined value, which may also be zero.

In German Patent Disclosure Document DE-OS No. 26 14 016, to which U.S. Pat. No. 4,085,979 corresponds, a two-channel anti-block controller is described in which a test signal is fed into the channels from time to time, particularly at a standstill, and the resultant signals are compared at different, corresponding positions in the channels. As disclosed, the safety circuit thus includes timing elements and comparison elements. If the signals do not agree, a warning and/or switching signal is generated. A safety circuit containing timing elements is also provided for both channels, and it can be monitored separately; the time constants of the timing elements are shortened as needed.

With respect to a two-channel anti-block controller, it is also known, from German Examined Application DE-AS No. 27 01 159, to which British Pat. No. 1,596,191 corresponds, to dispense with a safety circuit having timing elements, and to feed a test signal into the channels at predetermined intervals even while driving. Two test circuits are provided, in which the signals resulting at various positions of the two channels are compared; if they do not agree, the warning and/or switching signal is generated. As a result, a defect is recognized even if one test circuit should fail.

THE INVENTION

It is an object to provide a wheel anti-block controller having four control channels with a safety and test device which permits redundant monitoring of the system, wherein test signals need not be fed during driving, and which is attained at relatively little expense.

Briefly, a separate, individual safety circuit is provided for each pair of channels; each one of these individual safety circuits includes timing elements which monitor the response times of the respective circuits upon supply thereto of a test signal. The individual safety circuits are connected to the pair of brake control circuits. Additionally, the safety circuits are connected to a comparator, each, which monitors the concurrence or coincidence of the signal trains which occur in each one of the pairs of channels during the test cycle, to evaluate the signals with respect to their temporal occurrence, to the value of the signal which, typically, is a digital signal, or both; and which generate an output signal if there should be non-concurrence, indicative of a warning to an operator of the motor vehicle that the circuits are not functioning properly, which output signal can additionally be used to disable the anti-brake lock circuit, or to carry out other switching functions.

In the invention, the safety circuit having timing elements and comparator elements is retained, and the principle described in German Patent Disclosure Document DE-OS 26 14 016 (U.S. Pat. No. 4,085,979) is advantageously applied to a four-channel controller. Despite the four channels, only two safety circuits are required, and they monitor the channels redundantly. According to an embodiment of the invention, the same monitoring circuit which compares the control signals also is used in the test cycle to compare the signals generated in the safety circuit. The time constants of the safety circuit are advantageously shortened, so as not to prolong the test cycle excessively.

The monitoring circuit becomes particularly simple if, given a digital construction of the control channels, the digital signals to be transferred at a given time from one pair of channels to the safety circuit of the other pair of channels are first converted along the transfer routes into serial signals and then converted back again into parallel signals. Then it is necessary only to compare the individual signal parts of the serial signals as to their agreement, using series comparators in the monitoring circuit. This also applies to the comparison of the safety circuit signals when monitoring the safety circuit.

One exemplary embodiment of the invention will now be explained, referring to the drawings.

Shown are:

FIG. 1, an anti-block controller embodied in accordance with the invention; and

FIG. 2, the monitoring circuit which can be used with this anti-block controller.

DETAILED DESCRIPTION

Figure 1:
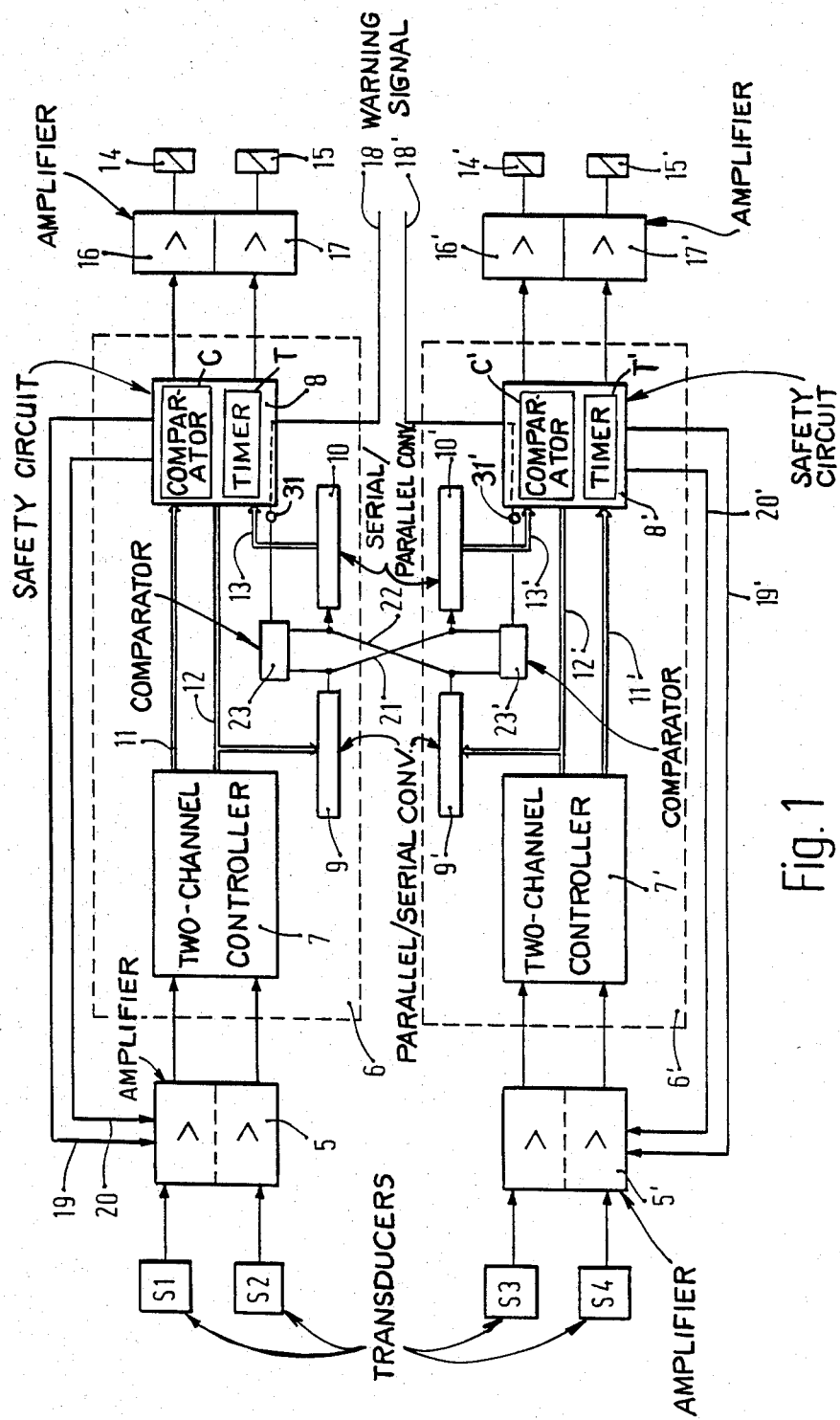

The wheel anti-block controller shown in FIG. 1 comprises four measurement value transducers $S_1$–$S_4$, which furnish signals corresponding to the wheel speed. The signals from the transducers $S_1$ and $S_2$ are delivered via a two-channel amplifier unit 5 to a block 6, which has a two-channel controller 7, a safety circuit 8 which includes a comparator C and a timer T, a data converter 9, a second data converter 10 and connecting channels 11–13. The elements 7–13 operate digitally; that is, digital words are transmitted in parallel over the connecting channels 11–13. These digital words also contain the valve trigger signals, which pass through the safety circuit and can be blocked there in the case of failure. These valve trigger signals activate the brake pressure control device via amplifiers 16 and 17; for the sake of simplicity, the brake pressure control device is shown here in the form of a valve 14 and 15 for the respective channels.

For the measurement value transducers $S_3$ and $S_4$, identically embodied elements are provided, corresponding to elements 5–17, and are identified as elements 5'–17'.

If signals occur at the measurement value transducers $S_1$–$S_4$ which indicate a tendency to blocking on the part of the associated wheels, then the controllers 7 and 7' generate digital signals, which in the form of parallel digital words proceed over the line systems 11 and 11' to the safety circuits 8 and 8'. The safety circuits 8 and 8', which have comparators C, C' and timing elements or timers T, T', monitor these control signals (but also, via the line systems 11 and 11', possible signals generated at various positions in the controllers 7 and 7') as to an excessive persistence and, as needed, and compare, for example with a time reference as to other impossible conditions as well. If such conditions occur, the safety circuits emit a warning and/or switch-OFF signal via the lines 18 and 18'. Possible conditions which can be monitored in a system having timing elements can be derived, for instance, from German Patent Disclosure Document DE-OS No. 22 32 034, to which U.S. Pat. No. 3,883,184 corresponds.

The signals of the controller 7 or 7' proceed via the line system 12 or 12' to the data converter 9 or 9' as well, are there converted respectively into a serial signal and are then transferred via lines 21 and 22 to the data converter 10 or 10'; after reconversion into a parallel signal they are then delivered via the line system 13 or 13' to the safety circuit 8 or 8' and are monitored by this safety circuit only as to whether impossible conditions exist. Thus both safety circuits 8 and 8' monitor the signals of both controllers, so that even if one safety circuit should fail, the occurrence of an impossible condition (defect) will be recognized.

The safety circuits 8 or 8' also contain the test devices, which from time to time, when the vehicle is stopped, perform monitoring of the system. To this end, the measurement value transducers $S_1$–$S_4$ are shut OFF via the lines 19 and 19', and an identical test signal is fed into all the channels via lines 20 and 20'. The test signal is so arranged that all the branches of the controller can be monitored. The signals occurring at the various locations (which locations correspond in each of the channels of the pair of channels) are compared in sequence with one another (corresponding to German Patent Disclosure Document DE-OS No. 26 14 016, U.S. Pat. No. 4,085,979) by means of the comparators C, C' in 8 and 8', forming test devices.

The digital signals then occurring in the line system 12 and 12' are serially transferred via the lines 21 and 22. For monitoring purposes, comparator circuits 23 and 23' are connected to these lines 21 and 22, testing the transferred signals with one another bit for c  to their identity with one another. Only when the transferred signals agree with one another bit for bit is it assured that there is no defect anywhere in the system.

Additionally, the operability of the safety circuits 8 and 8' is monitored in the same manner; to this end, their timing elements are shortened in their time constants, which if counters are used as the timing elements can be accomplished by increasing the clock frequency. Then signals are supplied to them which exceed the time constants, so that shut-OFF signals are produced. These signals proceed via the line systems 12 and 12' to the lines 21 and 22 and can thus likewise be monitored for identity, bit for bit, in fact redundantly, by means of the comparison circuits 23 and 23'. In addition, the comparison circuits 23 and 23' can be monitored as to their operability by feeding an error into them and monitoring whether they respond then as well.

Figure 2:
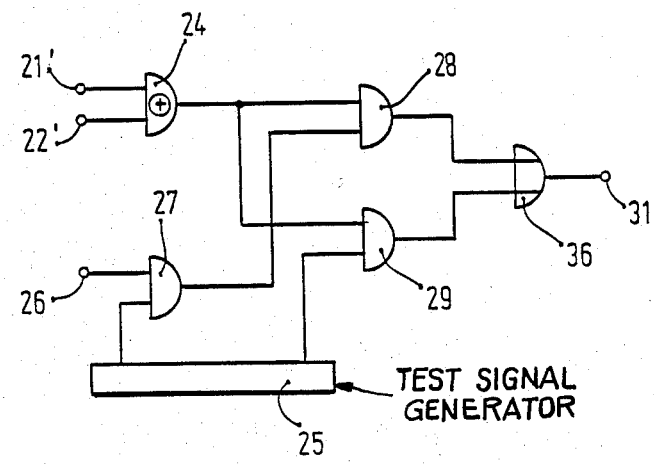

An embodiment of the monitoring or comparison circuit 23 which is possible and sufficient for the exemplary embodiment of FIG. 1 is shown in FIG. 2.

The lines 21 and 22 of FIG. 1 are connected to the terminals 21' and 22'. The exclusive OR gate 24 has an output signal whenever the signals simultaneously present at a given time do not agree, which means that a defect must then exist. During a first test control pulse arriving from test signal generator shown as block 25 and passed on via the AND gate 27, the digital words formed when the test signal is fed into the controllers 7 and 7' are compared bit for bit with one another. Nonagreement of the input signals of the OR gate 24 causes a signal to proceed via an AND gate 28 to the OR gate 36, the output signal of which, located at the terminal 31, represents the warning and/or switching signal. It should also be mentioned that the gate 27 is prepared by means of the shut-OFF signal supplied at the terminal 26 for the measurement value transducers (lines 19, 19').

As already noted above, the branches of the safety circuits which are equipped with timing elements can also be monitored, in that after the switchover of the timing elements these branches are caused to respond, and signals resulting at corresponding locations are then compared with one another. In this case this occurs in a directly subsequent control pulse, in which the AND gate 29 is prepared by the block 25 and if the signals fed in at 21' and 22' are different, the defect signal is generated at terminal 31 via this AND gate 29. If needed, still other signals of the system can then be monitored as well. Since the two safety circuits contain identical input signals of the controllers within the test cycle, even during driving, arbitrary junction of the safety circuit can be monitored for identity on a continuous basis.

We claim:

1. Anti-wheel block control system for separately monitoring the wheels of a vehicle having
   four identical control channels,
   each control channel including
   a sensor (S1, S2, S3, S4) sensing wheel behavior,
   an evaluation circuit (6, 6') evaluating the output signals from the associated sensor,
   and a brake control unit (16, 14; 17, 15; 16', 14'; 17', 15') coupled to and being controlled by the respective evaluation circuit,
   one channel, each, being associated with a wheel brake of the vehicle;
   a safety circuit means for monitoring the anti-wheel block system and for testing the operability of the anti-block control system at timed intervals in a test cycle and providing identical test signals, said identical test signals being coupled from the safety circuit means into all the channels;
   comparator means (C, C') within the safety circuit means connected to and comparing—by pairs—signals occurring at corresponding locations within said channels based on said test signals, for correspondence with respect to one another, the comparator means generating a malfunction output control signal if the compared signals deviate from one another,
   wherein, in accordance with the invention,
   the safety circuit means comprises
   separate safety circuits (8, 8') for each pair of channels including timing means for monitoring the temporal response time of the respective channels; and
   means for testing the operability of both safety circuit means and connected to both pairs of channels including
   at least one further comparator (23, 23'), being connected to the safety circuits (8, 8') for comparing, during the test cycle, agreement of the test signals separately generated for each channel pair,
   said at least one further comparator (23, 23') generating a malfunction output signal if the test signals differ from one another.

2. System according to claim 1, wherein the timing constants of said timing means are changeable during the course of the test cycle in a direction of shorter time constants;
wherein the test signal includes signals having a characteristic to test operability of all paths within the safety circuit means;
and wherein the at least one further comparator (23, 23') is additionally connected to the separate safety circuits (8, 8') and compares the responses of the safety circuits to the respective signals being applied to the system during the test cycle.

3. System according to claim 2, wherein the signals arising within the evaluation circuit and the safety circuit means are digital signals, the signals being transmitted from the evaluation circuits of the pairs of channels to the separate safety circuits in parallel digital form;
further including parallel-serial converters (9, 9') sensing the signals being transmitted in parallel form and converting the signals to serial form, the serial signals being applied to the at least one further comparator (23, 23') and
serial parallel converters (10, 10') connected to the separate safety circuits of the other pair of channels for reconverting the compared serial signals into parallel digital signals for processing within the individual safety circuits,
the at least one further comparator (23, 23') comparing the signals applied thereto in serial comparison form.

4. System according to claim 1, wherein the signals arising within the evaluation circuit and the safety circuit means are digital signals, the signals being transmitted from the evaluation circuits of the pairs of channels to the separate safety circuits in parallel digital form;
further including parallel-serial converters (9, 9') sensing the signals being transmitted in parallel form and converting the signals to serial form, the serial signals being applied to the at least one further comparator (23, 23') and
serial parallel converters (10, 10') connected to the separate safety circuits of the other pair of channels for reconverting the compared serial signals into parallel digital signals for processing within the individual safety circuits,
the at least one further comparator (23, 23') comparing the signals applied thereto in serial comparison form.

5. System according to claim 1, wherein two further comparators (23, 23') are provided, one each in each channel, and, respectively, connected to receive the test signals in one channel and compare said test signals of one channel with the test signals derived from the separate safety circuit of the other channel.

6. System according to claim 5, wherein the signals arising within the evaluation circuit and the safety circuit means are digital signals, the signals being transmitted from the evaluation circuit of the pairs of channels to the separate safety circuits in parallel digital form;
further including parallel-serial converters (9, 9') sensing the test signals being transmitted in parallel form and converting the parallel test signals to serial form, the serial test signals being applied to the respective separate further comparators (23, 23');
said signals being further connected to serial-parallel converters (10, 10') connected to the separate safety circuits (8, 8') of the other channel for reconverting the serial test signals into parallel digital test signals for processing by the comparators (C, C') within the individual safety circuits;
and wherein the separate comparators (23, 23') additionally compare the serial test signals being applied thereto by the serial-parallel converters, in serial form, of the respective channels.

7. Method of testing components of an anti-wheel block system having
four identical control channels,
each control channel including
a sensor (S1, S2, S3, S4) sensing wheel behavior,
an evaluation circuit (6, 6') evaluating the output signals from the associated sensor,
and a brake control unit (16, 14; 17, 15; 16', 14'; 17', 15') coupled to and being controlled by the respective evaluation circuit,
one channel, each, being associated with a wheel brake of the vehicle;
a safety circuit means for monitoring the anti-wheel block system and for testing the operability of the anti-block control system at timed intervals in a test cycle and providing identical test signals, said identical test signals being coupled from the safety circuit means into all the channels;
comparator means (C, C') within the safety circuit means connected to and comparing—by pairs—signals occurring at corresponding locations within said channels based on said test signals, for correspondence with respect to one another, the comparator means generating a malfunction output control signal if the compared signals deviate from one another,
comprising, in accordance with the invention, the steps of
monitoring the response times in a pair of channels, each associated with two sensors;
monitoring the response of the safety circuits to the identical test signals;
and comparing the signals occurring in the pairs of channels generated by means of the test signal, with one another, and generating a "malfunction" output signal in case of non-agreement of the signals in the two channel pairs, and in the respective safety circuits.

8. Method according to claim 7, wherein the signals transmitted in the pairs of channels are parallel digital signals;
including the step of converting the parallel digital signals to serial digital signals prior to said comparison step, and reconverting the signals to parallel digital signals after comparison to control the safety circuit as a function of the comparison and permit the safety circuit to respond to parallel digital signals being supplied thereto.

9. Method according to claim 7 wherein the safety circuits (8, 8') include timing circuits determining timing intervals,
further including the step of changing the timing intervals determined by the timing circuits.

10. Method according to claim 7, wherein the signals transmitted in the pairs of channels are parallel digital signals;
including the step of converting the parallel digital signal in any one channel to serial digital signals, and reconverting said serial digital signals to parallel digital signals, and coupling said reconverted parallel digital signals to the safety circuit of the other channel to effect a comparison of the parallel digital signals, after conversion and reconversion in one channel with the parallel digital signals in the other channel.

* * * * *